| United States Patent [19] | [11] Patent Number: 4,898,915 |
|---|---|
| Harwood et al. | [45] Date of Patent: Feb. 6, 1990 |

[54] ALTERNATING COPOLYMERIZATION OF DONOR MONOMERS HAVING PROTECTED AMINE GROUPS WITH ACCEPTOR MONOMERS

[75] Inventors: H. James Harwood, Stow; Ramendra N. Majumdar, Akron, both of Ohio; Shih-Liang Yang, Pamona, Calif.

[73] Assignee: University of Akron, Akron, Ohio

[21] Appl. No.: 525,953

[22] Filed: Aug. 24, 1983

[51] Int. Cl.⁴ .......................... C08F 18/22; C08F 20/52
[52] U.S. Cl. ................................ 525/326.7; 525/328.2; 525/376; 525/386; 526/259; 526/262; 526/292.1; 526/292.2; 526/292.3; 526/292.4; 526/292.9; 526/292.6; 526/310
[58] Field of Search ................ 525/328.2, 326.7, 326.9, 525/369, 376, 386; 526/259, 262, 292.1, 292.2, 292.3, 292.4, 292.5, 292.6, 310

[56] References Cited

U.S. PATENT DOCUMENTS

| 2,507,181 | 5/1950 | Reynolds et al. | 525/376 |
|---|---|---|---|
| 2,641,524 | 6/1953 | Chaney et al. | 526/310 |
| 2,656,339 | 10/1953 | Padbury | 526/310 |
| 2,691,640 | 10/1954 | Patterson et al. | 526/310 |
| 2,839,516 | 6/1958 | Weisgarber | 526/310 |
| 2,917,474 | 12/1959 | Fisher et al. | 526/310 |
| 3,547,858 | 12/1970 | Worrall | 525/369 |
| 3,700,647 | 10/1972 | Nakaguchi et al. | 526/310 |
| 3,700,648 | 10/1972 | Hirooka et al. | 526/262 |
| 3,877,936 | 4/1975 | Limburg et al. | 526/259 |
| 4,311,799 | 1/1982 | Miyake et al. | 526/310 |
| 4,379,068 | 4/1983 | Couderc | 526/310 |

*Primary Examiner*—Joseph L. Schofer
*Assistant Examiner*—Jeffrey T. Smith
*Attorney, Agent, or Firm*—Oldham & Oldham

[57] ABSTRACT

A composition and process for making an alternating copolymerization of acceptor monomers such as acrylic acid and derivatives thereof and donor monomers containing free amine groups therein such as an aminostyrene compound. The free amine groups are initially protected by conversion to an imide derivative such as phthalimide, or the like, and then reacted with the acceptor monomers. After copolymerization, the free amine is regenerated. The alternating copolymerization reaction is usually carried out in the presence of Lewis acids which act as complexing agents. The alternating copolymers of the present invention are useful as antistatic agents or as thickening agents as in oil recovery.

5 Claims, No Drawings

ALTERNATING COPOLYMERIZATION OF DONOR MONOMERS HAVING PROTECTED AMINE GROUPS WITH ACCEPTOR MONOMERS

This invention was made with government support under DMR 10709 awarded by the National Science Foundation. The government has certain rights in this invention.

TECHNICAL FIELD

The present invention relates to alternating copolymers having acceptor repeating units therein such as acrylic acid and alternating donor units having free amine groups. More specifically, the present invention relates to a process of preparing such a copolymer by protecting the free amine group during copolymerization and regenerating said free amine group after copolymerization.

BACKGROUND ART

Polymers and copolymers that contain amino groups are useful for many applications, depending on the concentration of amino groups present. When the amino content is low, these groups function as sites for crosslinking or curing, as sites for binding dyes or stabilizers and as reactive sites for other chemical and biochemical purposes. When the amine content is high, the polymers can function as ion-exchange resins if crosslinked or as a water soluble polyelectrolyte if not crosslinked.

Polymers that contain amino groups are prepared by three methods: (a) by direct polymerization of an unsaturated amine such as p-aminostyrene; (b) by polymerization of unsaturated amides, imides or urethanes, followed by hydrolysis of the amide, imide or urethane groups on the resulting polymer to thereby generate amine groups on the polymer; (c) by chemical modification of polymers, as for example, by reducing nitrated polystyrene to obtain polyaminostyrene or by reducing polyacrylamide to obtain polyalkylamine. These methods can also be used to prepare copolymers of amine-bearing monomers with other monomers.

When polymers and copolymers of vinyl amine are prepared, only method (b) mentioned above is appropriate because vinyl amine is unstable. Indeed, poly(vinylamine) has been prepared by hydrolysis or aminolysis of poly(N-vinyl phthalimide), poly(N-vinyl acetamide) and poly(t-butyl N-vinyl carbamate). Copolymers of N-vinyl phthalimide, N-vinyl acetamide, t-butyl N-vinyl carbamate or related monomers with other vinyl monomers, such as ethylene and vinyl chloride can be prepared by conventional free radical polymerization techniques that are well known in the art, but it is difficult to prepare copolymers of the vinyl amine derivatives with highly reactive vinyl monomers such as styrene, acrylate esters, methacrylate esters and acrylonitrile. It is especially difficult to prepare such copolymers if the content of vinyl amine derivative is high, greater than 40 percent, for example. Although previously available techniques may have been limited in the amount of vinyl amine derivative monomers that could be incorporated into copolymers, the amide, imide or carbamate protecting groups of the vinyl amine derivatives could be removed by hydrolysis, hydrazinolysis or aminolysis reactions.

It is known that copolymers having an alternating arrangement of monomer units can be prepared by copolymerizing vinyl monomers containing electron releasing substituents (methyl, phenyl, ether) with vinyl monomers containing electron attracting substituents (nitrile, ester, ketone) in the presence of Lewis acids such as $ZnCl_2$, $BCl_3$, $EtAlCl_2$, ethyl aluminum sesquichloride, etc. Information on this topic is discussed in reviews of Hirai [J. Polymer Science, Macromolecular Reviews, 11, 47 (1976)], and Furukawa [Rubber Chem. and Technol., 53, 600 (1978)], and Hirooka [Pure and Applied Chemistry, 53, 681 (1981)].

However, no one has previously prepared alternating copolymers of amino group bearing monomers or their derivatives with other monomers. We have discovered that with certain derivatives of amino group bearing monomers, it is possible to prepare alternating copolymers such as N-vinylphthalimide or N-(4-vinylphenyl)phthalimide with methyl acrylate or other monomers that contain electron accepting groups, if the copolymerizations are conducted in the presence of Lewis acids, such as ethyl aluminum sesquichloride. The resulting copolymers can be converted into copolymers containing amino groups by reaction with hydrazine. When the copolymers also contain ester groups, as in the case of copolymers containing methyl acrylate units, hydrolysis of the ester groups as well as generation of the amino groups can yield a copolymer containing an alternating sequence of amino and carboxylic acid groups. Polymers of this type have not been known previously.

DISCLOSURE OF INVENTION

It is therefore an aspect of the present invention to provide an alternating copolymer having an unprotected amine group.

It is yet another aspect of the present invention to provide alternating copolymers, as above, wherein the number average molecular weight can vary from about 10,000 to about 2,000,000.

It is yet another aspect of the present invention to provide alternating copolymers, as above, wherein said amine group is protected during the copolymerization reactions.

It is a yet further aspect of the present invention to provide alternating copolymers, as above, wherein acid anhydride compounds as well as phthalic anhydride compounds are utilized to protect the amine group during copolymerization reactions.

It is a yet further aspect of the present invention to provide alternating copolymers, as above, wherein after reaction, said amine protective groups are removed.

It is a yet further aspect of the present invention to provide alternating copolymers, as above, wherein said copolymer is hydrolyzed to remove any ring formation formed with said amine group.

It is a still further aspect of the present invention to provide alternating copolymers, as above, which can be utilized as thickening agents with regard to oil recovery.

In general, the alternating copolymers comprise: substantially alternating units having the formula

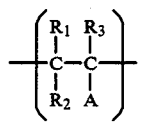

and a unit selected from the group consisting of

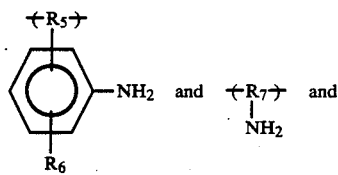
and
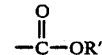

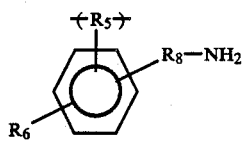

and combinations thereof;

where $R_1$, $R_2$ and $R_3$ can be the same or different and are selected from the group consisting of hydrogen, a halogen, an alkyl having from 1 to 6 carbon atoms, an aryl having from 6 to 15 carbon atoms, an alkyl substituted aryl having from 7 to 15 carbon atoms, an ester of the formula

where $R'$ is hydrogen, or an alkyl having from 1 to 20 carbon atoms;

where A is a nitrile group, or

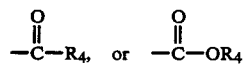

where $R_4$ is hydrogen, an alkyl having from 1 to 20 carbon atoms, an aryl having from 6 to 19 carbon atoms, an alkyl substituted aryl having from 6 to 20 carbon atoms, a halogen substituted phenyl having from 1 to 5 halogens thereon, a substituted aryl having from 6 to 20 carbon atoms with said substituted group being alkoxy, aryloxy, nitrilo, nitro, carboxyl, or a carboxylic ester group;

where $R_5$ is an alkylene group having from 2 to 6 carbon atoms, where $R_6$ is hydrogen, an alkyl having from 1 to 10 carbon atoms, a halogen, an alkoxy having from 1 to 10 carbon atoms, an aryloxy having from 6 to 20 carbon atoms, where $R_7$ is an alkylene having from 2 to 6 carbon atoms, and where $R_8$ is an alkylene group having from 2 to 6 15 carbon atoms or an alkylene arylene having from 7 t carbon atoms.

Additionally, the alternating copolymers comprise: substantially alternating units having the formula

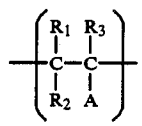

Formula VI and repeating units having a protected amine therein, where $R_1$, $R_2$ and $R_3$ can be the same or different and are selected from the group consisting of hydrogen, a halogen, an alkyl having from 1 to 6 carbon atoms, an aryl having from 6 to 15 carbon atoms, an alkyl substituted aryl having from 7 to 15 carbon atoms, an ester of the formula

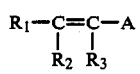

where R is hydrogen, or an alkyl having from 1 to 20 carbon atoms;

where A is a nitrile group, or

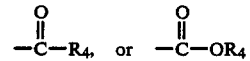

where $R_4$ is hydrogen, an alkyl having from 1 to 20 carbon atoms, an aryl having from 6 to 19 carbon atoms, an alkyl substituted aryl having from 6 to 20 carbon atoms, a halogen substituted phenyl having from 1 to 5 halogens thereon, a substituted aryl having from 6 to 20 carbon atoms with said substituted group being alkoxy, aryloxy, nitrilo, nitro, carboxyl, or a carboxylic ester group.

BEST MODE FOR CARRYING OUT THE INVENTION

According to the concepts of the present invention, alternating copolymers are made. One of the repeating units in the alternating copolymer is an acceptor monomer, and generally has an electronegative end group, such as methyl acrylate or derivatives thereof. The remaining repeating unit is formed from donor monomers having a free amine group thereon. The alternating copolymer is a true alternating copolymer in that it has good alternation of donor (amine) and acceptor monomers along its molecular chain. The molecular weight is generally high in that the number average molecular weight generally ranges from about 10,000 to about 2,000,000 and generally from about 500,000 to about 1,000,000.

The acceptor monomers have the following general formula:

$$R_1-C=C-A \quad \text{Formula No. I}$$
$$\phantom{R_1-}\begin{array}{cc}|&|\\R_2&R_3\end{array}$$

wherein $R_1$, $R_2$ and $R_3$ are hydrogen or halogen atoms or an alkyl group having from 1 to 6 carbon atoms, with all hydrogens being preferred. $R_1$, $R_2$ and $R_3$ can also be an aryl group having from 6 to 15 carbon atoms, an alkyl substituted aryl group having from 7 to 15 carbon atoms, or an ester group, that is

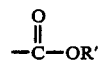

where $R'$ is hydrogen or an alkyl having from 1 to 20 carbon atoms, $R_1$, $R_2$ or $R_3$ can all be the same or different. A can be a nitrile group, that is $C\equiv N$, or

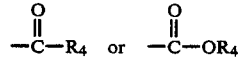

where $R_4$ can be hydrogen atom or an alkyl group having 1 to 20 carbon atoms, desirably 1 to 4 carbon atoms with hydrogen or methyl being preferred; an aryl group having from 6 to 19 carbon atoms with phenyl being preferred, an alkyl substituted aryl group having from 6 to 20 carbon atoms with 6 to 10 carbon atoms being preferred, a halogen-substituted phenyl group having from 1 to 5 halogen groups, with chlorine being preferred, or a substituted aryl group containing 6 to 20 carbon atoms total with one or more substituents such as alkoxy, aryloxy, nitrilo, nitro, carboxy, carboxylic ester groups, etc. Examples of specific acceptor monomers include methyl acrylate, ethyl acrylate, methyl methacrylate, methyl γ-chloroacrylate, acrylonitrile, acrolein, and methyl vinyl ketone, with methyl acrylate, ethyl acrylate, methyl methacrylate and acrylonitrile being preferred.

The donor monomers or the monomers containing a free amine group can have formulation No. II or III as follows:

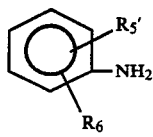

Formula No. II

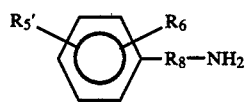

Formula III(a)

or

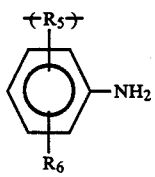

Formula III(b)

$R_5'$ is an alkenyl group having from 2 to 6 carbon atoms with 2 carbon atoms being preferred. $R_6$ can be a hydrogen atom, an alkyl group having from 1 to 10 carbon atoms, a halogen atom, with chlorine atoms being preferred, an alkoxy group having from 1 to 10 carbon atoms, or an aryloxy group having from 6 to 20 carbon atoms. $R_7'$ is an alkenyl group having from 2 to 6 carbon atoms with 2 carbon atoms being preferred. $R_8$ is an alkylene having from 2 to 6 carbon atoms or an alkylene arylene having from 7 to 15 carbon atoms. Specific examples of donor monomers having free amine groups include aminostyrene, vinyl toluidine, amino-chlorostyrene, amino-dimethylstyrene, amino-methyl-chlorostyrene, p-amino-α-methylstyrene, p-aminomethylstyrene, vinyl amine, 3-aminopropene, 3-aminobutene, and 4-aminobutene, with aminostyrene and vinyl amine being preferred.

When incorporated into polymers and copolymers, the donor monomers will have a repeating unit of the formulation as set forth in Formulations IV or V.

Formula IV

Formula V(a)

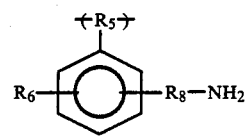

Formula V(b)

As is apparent from the formulations, the amine group will be pendant therefrom and will be a free amine group.

The acceptor monomers, upon reacting, will have the structure as shown in Formula VI.

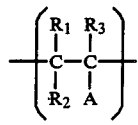

Formula VI

In order to form the alternating copolymers of the present invention, the free amine must be protected with a protecting group. One such method is the utilization of an anhydride compound which reacts with the amine to form an imide. An anhydride compound having the structure as set forth by Formulas VII and VIII and IX can be utilized.

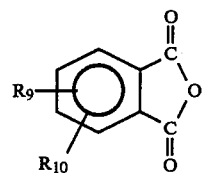

Formula VII

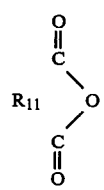

Formula VIII

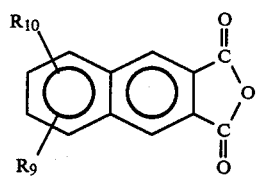

Formula IX wherein $R_9$ and $R_{10}$ can be the same or different and is an alkyl group having from 1 to 8 carbon atoms, an aryl group having from 6 to 20 carbon atoms, an alkoxy group having from 1 to 8 carbon atoms, an aryloxy group having from 6 to 20 carbon atoms, or a halogen atom such as chlorine, or a hydrogen atom. $R_{11}$ is a bivalent hydrocarbon group having from 1 to 18 carbon atoms, desirably an alkylene group having from 1 to 6 carbon atoms, with 2 or 3 carbon atoms being preferred.

The reaction of the donor monomer containing the free amine groups therein with the anhydride can be carried out utilizing an inert atmosphere, for example nitrogen at a temperature range of from about minus 100° to about 90° C., preferably from about minus 20° to about 40° C. Room temperature is often suitable and a conventional solvent known to the art such as dimethyl formamide may be utilized. A precipitated product is obtained which is then filtered as in Example 1 and then dried.

The net result is the conversion of the free amine to an imide compound or derivative thereof. Thus, an amine monomer having a structure as set forth in Formula II, when reacted with an anhydride as shown in Formula VII, will have the resulting formulation as shown in Formula X(a). Similarly, when reacted with an anhydride of Formulation VIII, a compound having the formulation of X(b) will result. Moreover, when reacted with an anyhydride having Formula IX, a compound is formed having the Formulation of FIG. Xc. Although monomers having the Formula IIIa are very unstable and generally do not exist, their corresponding derivatives such as ae represented by Formula XIa, XIb, and XIc can be prepared indirectly, as known to those skilled in the art, and these derivatives can be used in the synthesis in the same manner as those represented by Formulas Xa through Xc and XIIa through XIIc. When the amine compound of Formula III(b) is reacted with the anhydride of Formulas 7, 8 and 9, the compounds as set forth respectively by Formulas XII(a), XII(b), and XII(c) are formed.

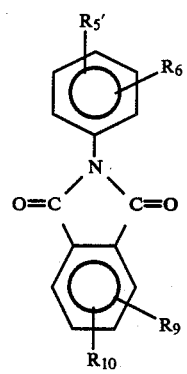

Formula X(a)

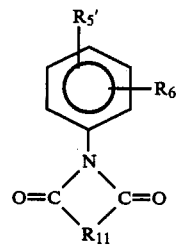

Formula X(b)

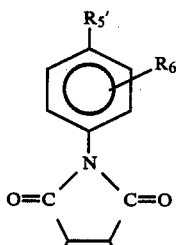

Formula X(c)

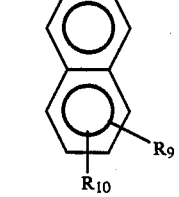

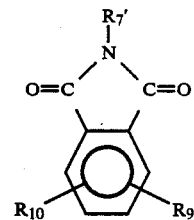

Formula XI(a)

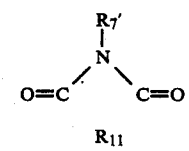

Formula XI(b)

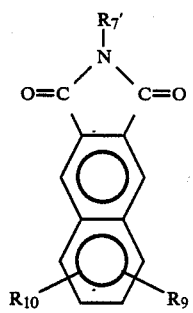

Formula XI(c)

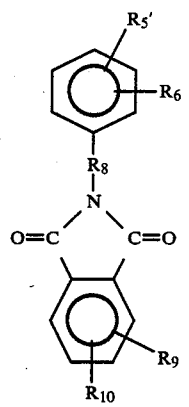

Formula XII(a)

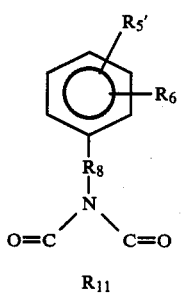

Formula XII(b)

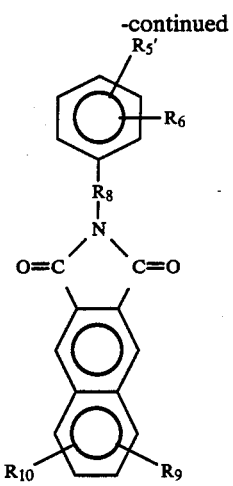

Formula XII(c)

Once the free amine groups of the donor molecules have been protected, the copolymerization reaction can be initiated. The reaction generally occurs in a vessel or a container having little or no moisture therein and previously purged as with an inert gas such as nitrogen. The acceptor monomer is generally added to the vessel first, along with any suitable conventional solvent known to the art, if desired, such as toluene. A complexing agent is often desired in order to promote the copolymerization. Generally, Lewis acids can be utilized as is well known to those skilled in the art. Specific examples include boron trichloride, ethyl aluminum dichloride, ethyl aluminum sesquichloride (EASC), zinc chloride, and the like. Such Lewis acids are generally conventional and well known to the art. The amount of complexing agent generally varies from about 0.001 to about 1.0 mole for mole of acceptor monomer and preferably from about 0.3 to about 1.0 mole. It is to be understood that at times a complexing agent helps in the production of the alternating copolymer but that is not always required.

Since the complex formation may be very exothermic, the temperature of the vessel is kept quite low, as for example, minus 78° C. or less, and preferably minus 50° C. or less. The imide converted donor monomers are then added to the reaction vessel. The reaction is carried out in an inert atmosphere such as nitrogen. The reaction rate is generally promoted by an increase in temperature and hence the reaction can generally be initiated by allowing the reactants to approach room temperature. If desired, a faster reaction rate can be obtained by slightly heating the reactants. Usually, the polymerization is carried out at a temperature of from about minus 100° C. to about 100° C. and preferably from about minus 78° C. to about 30° C.

In order to promote the reaction, conventional free radical initiators well known to those skilled in the art can also be utilized. Examples of such initiators include various peroxides such as benzyl peroxide, t-butyl peroxypivalate, diisopropyl peroxydicarbonate, lauroyl peroxide, acetyl peroxide, t-butyl hydroperoxide, various azo compounds such as azobisisobutronitrile, diisopropyl azodiformate, and the like. The amount of free radical initiator generally varies from about 0.001 to about 0.1, and desirably from about 0.01 to about 0.1 moles when the total moles of both the acceptor monomers and said donor monomers is one.

Alternating copolymers are formed when the acceptor monomer content of the reactants is less than 85 mole percent. Generally, the amount of acceptor monomer will range from about 10 to about 60 mole percent based upon the total number of moles of said acceptor monomer and said donor monomer. The alternating copolymers can be isolated from the reaction mixture by pouring it into a non-solvent such as methanol.

The amine protective group is removed through the use of basic compounds, for example hydrazine, a preferred compound, or substituted hydrazines, that is $R_a$-NHNH-$R_b$ where $R_a$ and $R_b$ can be the same or different and can be an aliphatic having from 1 to 10 carbon atoms such as an alkyl group having from 1 to 10 carbon atoms or an aryl having from 6 to 10 carbon atoms. The removal of the amine protective group is usually carried out at a temperature of from about minus 78° C. to about 150° C. with from about 10° C. to about 40° C. being desired. Usually, the copolymer and the hydrazine can be added to a good solvent for the copolymer, such as chloroform and the reaction allowed to proceed. After completion of the reaction, the by-product of the reaction, which is a product of the basic compound, for example, hydrazine, and the imide protecting group, is usually present in the form of a precipitate and is removed by filtration. The remaining product after removal of the solvent is the alternating copolymer having alternating repeating units therein as shown by either Formula V or VI for the free amine repeating unit and Formula VII for the monomer acceptor repeating unit. Should "A" of the acceptor repeating unit be

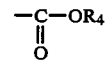

said $R_4$ group can be removed with any strong base such as sodium hydroxide. Should "A" of the acceptor repeating unit be C≡N, it can be converted into a —COOH or —COOM group where M is a metal ion such as sodium or potassium, by acidic or basic hydrolysis.

The end product is an alternating copolymer containing amine and carboxylic acid bearing units having a good alternating factor, for example 99 percent, as judged by its nuclear magnetic resonance spectrum which is devoid of signals that would be detected if acceptor repeating units were adjacent to each other in the copolymer or if donor repeating units were adjacent to each other. Generally, any alternating factor of 90 or greater is desired, with a factor of at least 95 percent, especially at least 98 percent, being preferred. The polymer may be water soluble and, as previously noted, has a high molecular weight. The alternating copolymer can be used in various applications including as a thickening agent, a water soluble film, or as an antistatic coating. One area of preferred use is as a thickening agent in the secondary and tertiary recovery of oil.

When removing the protecting imide group from some alternating copolymers, the proximity of adjacent amine- and ester- (or nitrile)-bearing units may promote intramolecular cyclization reactions to occur. For example, when the alternating copolymer of methyl acrylate and N-vinylphthalimide is allowed to react with hydrazine, amine groups generated on the polymer backbone readily cyclize with adjacent methyl acrylate units to form methanol and cyclic lactam units, viz.

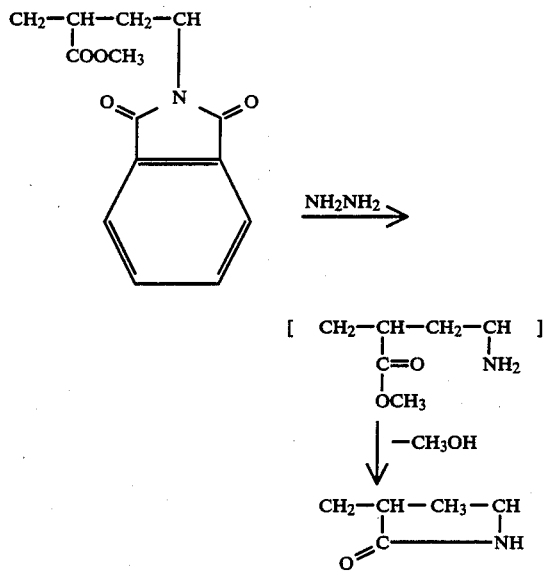

The lactam formation is evidenced by elemental analysis of the hydrazinolysis product and by the observation of amide I absorption at 1630 cm$^{-1}$ in the infrared spectrum of the product.

Cyclization can be avoided by hydrolyzing the methyl acrylate units prior to the hydrazinolysis step or the lactam units can be hydrolyzed in the conventional way, using bases to promote the reaction. For example, heating a suspension of the hydrazinolysis product derived from the alternating copolymer of methyl acrylate and N-vinylphthalimide with a solution of sodium or potassium hydroxide in water, yields as water soluble polyelectrolyte, viz.

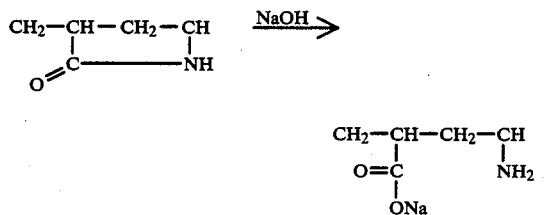

The invention will be better understood by reference to the following examples.

EXAMPLE 1

By means of a dropping funnel, 12.3 grams of p-aminstyrene was added during 30 minutes, with stirring, to a solution of 15.3 grams of phthalic anhydride in 60 ml of N,N-dimethylformamide that was maintained under a blanket of dry nitrogen. The reaction mixture was stirred at room temperature for thirty minutes. A mixture of 11.5 grams of acetic anhydride and 8.2 grams of anhydrous pyridine was then added to the reaction mixture and stirring was continued until a yellow crystalline precipitate formed. This was collected by filtration and dried to constant weight. This material, which weighed 309.5 grams was purified by recrystallization from benzene. The purified product melted at 201.5°–202° C. It was shown by NMR spectroscopy to be N-(4-vinylphenyl)phthalimide.

EXAMPLE 2

A solution of 1.0 gram of methyl acrylate in 30 milliliters of dry toluene was added to a solution of 1.42 grams of ethyl aluminum sesquichloride in 5.4 milliliters of toluene under a nitrogen atmosphere at minus 78° C. The reaction mixture was stirred for an additional 10 minutes and was then allowed to warm to room temperature, with stirring during 20 minutes. The mixture was recooled to minus 78° C. and a solution of 0.49 grams of N-(4-vinylphenyl)phthalimide as produced in Example 1 in 10 milliliters of toluene was added. The reaction mixture was allowed to warm to room temperature and was stirred at room temperature for three hours. At the end of this time, polymer had precipitated from the reaction mixture and formed a coating on the reaction vessel. The remainder of the reaction mixture was removed by decantation and the polymer was triturated with methanol and collected by filtration. It was purified by dissolution in chloroform followed by filtering the resulting solution and pouring the solution into methanol to reprecipitate the polymer. The polymer was collected by filtration and dried. The yield was 0.22 gram. The NMR spectra of the polymer indicated that it contained equimolar amounts of methyl acrylate and N-(4-vinylphenyl)phthalimide units, and that these units were arranged in an alternating fashion along the polymer chain. Thus, the proton NMR spectrum of the polymer showed that 47 percent of the protons present were attached to aromatic rings and the carbon-13 NMR spectrum of the copolymer contained a single signal at 175.8 ppm. Three signals in the vicinity of 175.8 ppm would have been present if the methyl acrylate units were present in non-alternating sequences in the copolymer.

In this experiment, the molar ratios of methyl acrylate, N-(4-vinylphenyl)phthalimide and ethyl aluminum sesquichloride employed were in the ratio of 0.85/0.15/0.425, respectively. Similar experiments were conducted in which the molar ratios and reaction times were varied. In most cases, the copolymer contained approximately equal molar amounts of the two monomers. The results of these experiments are summarized in Table I. The fact that copolymers with equal amounts of the two monomers were obtained under such diverse conditions also proves that the copolymerization reaction is yielding alternating copolymers.

TABLE I

Copolymerization of Methylacrylate (MA) with N—(4-vinylphenyl)phthalimide (NVPP) in the Presence of Ethyl Aluminum Sesquichloride (EASC)

| Molar Ratios of Reactants (MA/N-VPP/EASC) | Reaction Time | Conversion % | Mole Percent Methyl Acrylate in Copolymer |
|---|---|---|---|
| 0.256/0.744/0.128 | 12 hours | 25 | 51 |
| 0.489/0.510/0.245 | 20 hours | 48 | 50 |
| 0.581/0.419/0.291 | 20 hours | 52 | 51 |
| 0.855/0.145/0.145 | 3 hours | 33 | 51 |
| 0.914/0.086/0.457 | 10 hours | 15 | 57 |

EXAMPLE 3

A solution of 6.5 grams of methyl acrylate in 10 milliliters of toluene was added to a solution of 4.64 grams of ethyl aluminum sesquichloride in 17 milliliters of toluene at minus 78° C. and under a blanket of nitrogen. The mixture was stirred for 10 minutes and allowed to warm to room temperature with stirring during 20 minutes. The mixture was recooled to minus 78° C. and then a solution of 15.9 grams of N-vinylphthalimide in 70 milliliters of toluene was added, with stirring. The reaction mixture was allowed to warm to room temperature and was stirred at room temperature for 9 hours. As in the previous example, the polymer had precipitated and formed a coating on the walls of the reaction vessel. The remainder of the reaction mixture was removed by decantation and the polymer was triturated with methanol and collected by filtration. It was purified by dissolution in chloroform, followed by filtration of the resulting solution and pouring the solution into methanol to reprecipitate the polymer. The polymer was collected by filtration and dried to constant weight. The yield was 5.7 grams or 25 percent of the theoretical. NMR analysis indicated that the polymer contained 51 mole percent methyl acrylate units and that the methyl acrylate and N-vinylphthalimide units alternated along the polymer chain. Thus, the carbon-13 NMR spectrum of the copolymer did contain a single signal at 168.7 ppm, whereas the spectrum of a non-alternating copolymer would contain three signals in the vicinity of 168.7 ppm. In this experiment, the molar ratios of methyl acrylate (MA) to N-vinylphthalimide (NVP) to ethyl aluminum sesquichloride were 0.452/0.548/0.226, but many similar copolymer compositions were obtained when other molar ratios and reaction times used, as can be seen in Table II.

TABLE II

Copolymerization of Methylacrylate (MA) with
N—(4-vinylphenyl)phthalimide (NVPP) in the
Presence of Ethyl Aluminum Sesquichloride (EASC)

| Molar Ratios of Reactants (MA/NVP/EASC) | Reaction Time | Conversion % | Mole Percent MA in Copolymer |
|---|---|---|---|
| 0.250/0.750/0.125 | 10 hours | 12 | 50.0 |
| 0.400/0.600/0.200 | 10 hours | 18 | 51.7 |
| 0.450/0.550/0.225 | 9 hours | 25 | 51.5 |
| 0.490/0.510/0.245 | 3.5 hours | 21 | 50.3 |
| 0.600/0.400/0.300 | 9.5 hours | 11.7 | 55.3 |
| 0.750/0.250/0.375 | 10 hours | 4.5 | 59.8 |

EXAMPLE 4

Three grams of hydrazine was added to a solution of 0.64 grams of an alternating copolymer of methyl acrylate with N-(4-vinylphenyl)phthalimide in 60 milliliters of chloroform. The copolymer was prepared according to Example 2. The solution was stirred at room temperature for 10 hours and precipitation of a solid product was observed. The solid product, which was mostly 2,3-dihydro-1,4-phthalazinedione was removed by filtration and the chloroform solution was evaporated to obtain 0.35 grams of the alternating copolymer of p-aminostyrene and methyl acrylate. Elemental analysis indicated that the copolymer absorbs one mole of water per aminostyrene unit. Thus, the calculated carbon, hydrogen and nitrogen contents for alternating copolymer with one mole of water per aminostyrene are in agreement with measured carbon, hydrogen and nitrogen contents, as is shown by the data below.

| Calculated for $[C_{12}H_{15}NO_2 \cdot H_2O]_n$ | | Observed |
|---|---|---|
| % C | 64.55 | 63.94 |
| % H | 7.67 | 7.21 |
| % N | 6.27 | 6.33 |

In addition, the NMR spectrum of the product contained signals in three general areas. The signals having δ values ranging from 6 to 7 ppm are due to hydrogens on aromatic rings. The signals having δ values ranging from 2.7–3.7 ppm are due to methoxy and amine protons and the signals having δ values ranging from 0.7 to 2.7 ppm are due to methylene and methyl protons. The relative area of these signals indicate that for every four aromatic protons there are 5 methoxy-plus amine protons and six methylene plus methine protons. These results indicate that the copolymer contains equimolar amounts of aminostyrene and methyl acrylate units. Furthermore, FIG. 1B does, not contain any signals of the phthalimide ring at δ=7.8 ppm, indicating that the protecting group was completely removed.

EXAMPLE 5

A solution of 1.9 grams potassium hydroxide in 7.4 grams of methanol was added to a solution of 0.3 gram of the polymer prepared in Example 4 in 28 milliliters of chloroform while the latter solution was refluxing. A yellow color developed immediately. The mixture was refluxed and stirred for two hours. It was then filtered to remove the polymer that had precipitated. The polymer was washed with methanol to remove some KOH and then dried to constant weight in vacuum. The yield was 0.2 grams. It was soluble in water, and in aqueous acids and bases. Its infrared spectrum was devoid of ester absorption at 1720 cm$^{-1}$ and it contained bands at 1100 and 1440 cm$^{-1}$ that are due to the asymmetric and symmetric vibrations of the carboxylate ion.

EXAMPLE 6

One-half of a gram of hydrazine was added to a solution of 0.266 grams of the alternating copolymer of methyl acrylate with N-vinylphthalimide in 20 milliliters of chloroform. The copolymer had been prepared as described in Example 3. The resulting solution was stirred at room temperature for 22 hours. The solid that formed was isolated by filtration and found to weigh 0.24 grams. It was suspended in a solution of 14.4 grams of hydrazine in 71 milliliters of methanol and the suspension was stirred for 5 hours. The remaining solid was collected by filtration, washed several times with methanol and dried under vacuum to constant weight. The product weighed 0.084 gram. It was soluble in trifluoroacetic acid and in water that contained some potassium hydroxide. Its IR spectrum was devoid of absorption due to the phthalimide ring at 3030 cm$^{-1}$ (aromatic C—H bending), at 1770 and 1700 cm$^{-1}$ (doublet carbonyl stretching of imide), 1600 and 1458 cm$^{-1}$ (aromatic C—C stretching), 1360, 1120 and 708 cm$^{-1}$ (deformation bending of imide ring) 780 cm$^{-1}$ (aromatic C—H bending) and shows the presence of a lactam ring at 1630cm$^{-1}$. In addition, the amount of methoxy protons present was much less than expected. These results, coupled with the high nitrogen content of the polymer (14.3 percent nitrogen) indicated that vinyl amine units on the polymer had reacted wih adjacent methyl acrylate units to yield cyclic lactam units. The nitrogen content calculated for a polymer containing lactam units (Formula XII) is 14.4 percent.

EXAMPLE 7

1.9 grams of the polymer prepared according to Example 6 was suspended in a solution containing 1.9 grams of potassium hydroxide and 1.3 grams of water and the suspension was heated at 70° C. and stirred for 24 hours. At the end of this time, the polymer had completely dissolved and a clear solution was obtained. This was evaporated to dryness and the infrared spectrum of the residue was recorded. It was devoid of the amide I band at 1630cm$^{-1}$ and a band at 1540 cm$^{-1}$ due to the asymmetric stretching of the carboxylate ion was present. This demonstrated that the alternating copolymer of vinyl amine and potassium acrylate had been formed. The polymer was soluble in dilute KOH solution and in dilute HCl but was insoluble in pure water.

While in accordance with the patent statutes, a preferred mode and best embodiment has been set forth in detail, it is to be understood that the scope of the invention is measured by the scope of the attached claims.

What is claimed is:

1. An alternating copolymer, consisting of:
   substantially alternating units having the formula

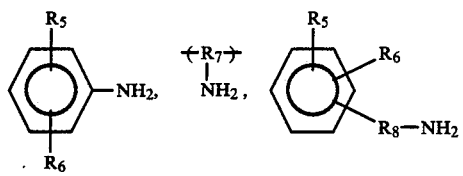

and units that are selected from the amine group containing units consisting of

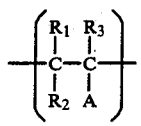

and combinations thereof, some of said amine groups containing protected amine groups thereon, where $R_1$, $R_2$ and $R_3$ can be the same or different and are selected from the group consisting of hydrogen, a halogen, an alkyl having from 1 to 6 carbon atoms, an aryl having from 6 to 15 carbon atoms, and alkyl substituted aryl having from 7 to 15 carbon atoms, and an acid or ester of the formula

where R' is hydrogen, or an alkyl having from 1 to 20 carbon atoms;
where A is a nitrile group, or

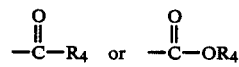

where $R_4$ is hydrogen, an alkyl having from 1 to 20 carbon atoms, an aryl having from 6 to 19 carbon atoms, an alkyl substituted aryl having from 6 to 20 carbon atoms, a halogen substituted phenyl having from 1 to 5 halogens thereon, a substituted aryl having from 6 to 20 carbon atoms with said substituted group being alkoxy, aryloxy, nitrilo, nitro, carboxyl, or a carboxylic acid ester group,
where $R_5$ and $R_7$ each represents a substituted ethylene group having from 2 to 6 carbon atoms,
where $R_6$ is hydrogen, an alkyl having from 1 to 10 carbon atoms, a halogen, an alkoxy having from 1 to 10 carbon atoms or an aryloxy having from 6 to 20 carbon atoms, and where $R_8$ is an alkylene having from 2 to 6 carbon atoms or an alkylene arylene having from 7 to 15 carbon atoms, said alternating unit contains protected amino groups therein being made from a compound having the formula selected from

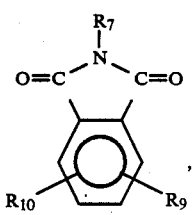 Formula XI(a)

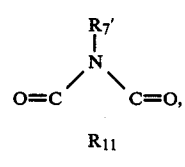 Formula XI(b)

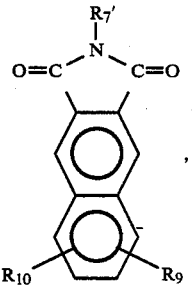 Formula XI(c)

where $R_9$ and $R_{10}$ each represents a hydrogen, an alkyl having from 1 to 8 carbon atoms, an aryl having from 6 to 20 carbon atoms, an alkoxy having from 1 to 8 carbon atoms, an aryloxy having from 6 to 20 carbon atoms, or a halogen; and
wherein said $R_{11}$ is a hydrogencarbon having from 1 to 18 carbon atoms using one specie thereof which has been reacted with a basic compound.

2. An alternating copolymer according to claim 1, wherein said amine protected group has been removed by reacting said amine protected group with a basic compound selected from the group consisting of hydrazine and a substituted hydrazine where an alkyl group or an aryl group is substituted on the hydrazine.

3. An alternating copolymer, consisting of:
   substantially alternating units having the formula

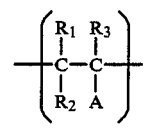

and units that are selected from the amine group containing units consisting of

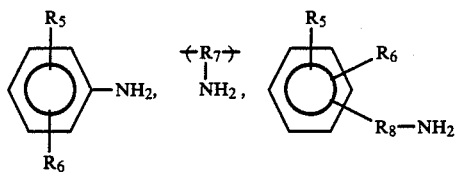

and combinations thereof, some of said amine groups containing protected amine groups thereon, where $R_1$, $R_2$ and $R_3$ can be the same or different and are selected from the group consisting of hydrogen, a halogen, an alkyl having from 1 to 6 carbon atoms, an aryl having from 6 to 15 carbon atoms, an alkyl substituted aryl having from 7 to 15 carbon atoms, and an acid or ester of the formula

where R' is hydrogen, or an alkyl having from 1 to 20 carbon atoms;
where A is a nitrile group, or

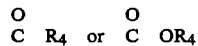

where $R_4$ is hydrogen, an alkyl having from 1 to 20 carbon atoms, an aryl having from 6 to 19 carbon atoms, an alkyl substituted aryl having from 6 to 20 carbon atoms, a halogen substituted phenyl having from 1 to 5 halogens thereon, a substituted aryl having from 6 to 20 carbon atoms with said substituted group being alkoxy, aryloxy, nitrilo, nitro, carbonxyl, or a carboxylic acid ester group, where $R_5$ and $R_7$ each represents a substituted ethylene group having from 2 to 6 carbon atoms, where $R_6$ is hydrogen, an alkyl having from 1 to 10 carbon atoms, a halogen, an alkoxy having from 1 to 10 carbon atoms or an aryloxy having from 6 to 20 carbon atoms, and where $R_8$ is an alkylene having from 2 to 6 carbon atoms or an alkylene having from 7 to 15 carbon atoms, said alternating unit contains protected amino groups therein being made from a compound having the formula selected from

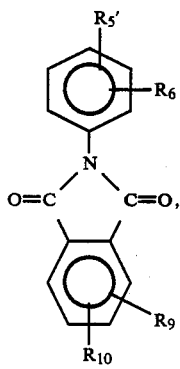

Formula X(a)

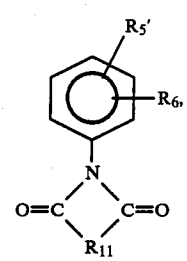

Formula X(b)

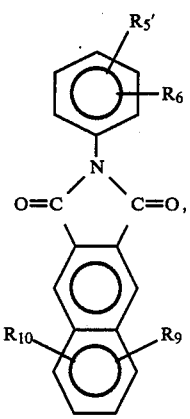

Formula X(c)

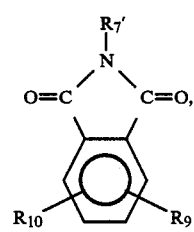

Formula XI(a)

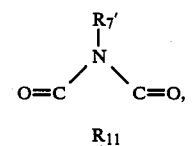

Formula XI(b)

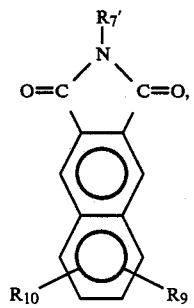

Formula XI(c)

-continued

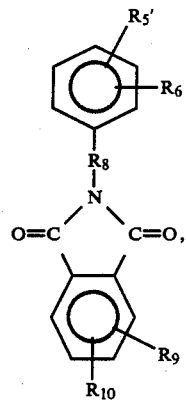

Formula XII(a)

Formula XII(b)

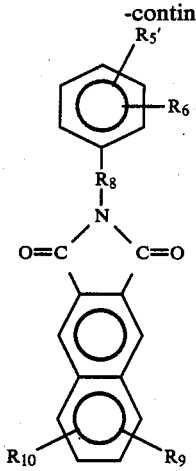

Formula XII(c)

where $R_9$ and $R_{10}$ each represents a hydrogen, an alkyl having from 1 to 8 carbon atoms, an aryl having from 6 to 20 carbon atoms, an alkoxy having from 1 to 8 carbon atoms, an aryloxy having from 6 to 20 carbon atoms, or a halogen; and wherein said $R_{11}$ is a hydrocarbon having from 1 to 18 carbon atoms using one specie thereof which has been reacted with a basic compound.

4. An alternating copolymer according to claim 3, wherein said basic compound is selected from the group consisting of hydrazine and a substituted hydrazine where an alkyl group or an aryl group is substituted on the hydrazine.

5. An alternating copolymer of claim 3 wherein the substituted hydrazine has the formula $R_a$—NHNH—$R_b$ and substituting groups $R_a$ and $R_b$ can be the same or different and contain 1 to 10 carbon atoms where the substituting group is alkyl and 6 to 10 where it is aryl.

* * * * *